United States Patent [19]

Pennell et al.

[11] 4,259,152
[45] Mar. 31, 1981

[54] WELD FAILURE DETECTION

[75] Inventors: William E. Pennell, Unity Township, Westmoreland County; Harry G. Sutton, Jr., Mt. Lebanon, both of Pa.

[73] Assignee: The United States of America as represented by the Department of Energy, Washington, D.C.

[21] Appl. No.: 965,364

[22] Filed: Nov. 30, 1978

[51] Int. Cl.³ ............................................. G21C 17/00
[52] U.S. Cl. ................................................ 176/19 LD
[58] Field of Search .................. 176/19 R, 19 LD, 80; 73/40, 7

[56] References Cited

U.S. PATENT DOCUMENTS

| T963,003 | 10/1977 | Schrock et al. | 73/40.7 |
|---|---|---|---|
| 3,079,322 | 2/1963 | Stockdale et al. | 176/80 |
| 3,092,565 | 6/1963 | William et al. | 176/80 |
| 3,147,190 | 9/1964 | Williams | 176/19 R |
| 3,157,580 | 11/1964 | Williams | 176/80 |
| 3,235,466 | 2/1966 | Williams et al. | 176/80 |
| 3,489,311 | 1/1970 | Folkerts et al. | 73/40.7 |
| 3,629,539 | 12/1971 | Roberts | 73/40.7 |
| 3,664,922 | 5/1972 | Diwinsky et al. | 176/19 R |
| 4,033,813 | 7/1977 | Holt et al. | 176/19 LD |

OTHER PUBLICATIONS

Nuclear Technology, vol. 26 (8175), pp. 472–479, Strand et al.

Primary Examiner—S. A. Cangialosi
Attorney, Agent, or Firm—Edward L. Levine; Z. L. Dermer

[57] ABSTRACT

Method and apparatus for detecting failure in a welded connection, particularly applicable to not readily accessible welds such as those joining components within the reactor vessel of a nuclear reactor system. A preselected tag gas is sealed within a chamber which extends through selected portions of the base metal and weld deposit. In the event of a failure, such as development of a crack extending from the chamber to an outer surface, the tag gas is released. The environment about the welded area is directed to an analyzer which, in the event of presence of the tag gas, evidences the failure. A trigger gas can be included with the tag gas to actuate the analyzer.

12 Claims, 5 Drawing Figures

WELD FAILURE DETECTION

The invention disclosed herein was made or conceived in the course of, or under a contract with the United States Department of Energy identified as No. E(11-1)-2395.

BACKGROUND OF THE INVENTION

1. Field of the Invention

This invention relates to welds and methods and apparatus for detecting development of a failure within a weld, particularly useful in nuclear reactor systems.

2. Description of the Prior Art

In order to ensure reliability of any structural system including fastened components, such as those joined by welds, it is common practice for the welded area to be periodically inspected for evidence of crack initiation, metal separation or other failure. While many devices are available for such inspections, some provide indications not consistent with the degree of accuracy required, and some are not readily adaptable to remote use.

An application where accurate and rapid indications of weld failure are particularly desirable is in nuclear reactors, particularly in relation to main structural components within the reactor vessel which support the nuclear core. For example, while the core of fuel assemblies is typically bottom supported by a lower support structure, control rods which are reciprocatingly insertable to control core reactivity are top mounted. In the unlikely event of failure of the lower support structure attachment welds, undesirable separation of, or interference between, the control rods and fuel assemblies could result. In-service inspection programs have been instituted by the nuclear industry for inspection of such welds, including remote visual indicators useful, for example, in water-cooled reactors. With liquid metal cooled reactors, however, such visual indicators are not readily adaptable as a result of the opaque nature of the coolant. And, typical inspection systems require costly items such as multiple access ports and equipment and time consuming inspections carried out closely adjacent to the welded area.

In order to detect flaws in other reactor components, such as fuel rods, liquid metal reactors have been proposed which include the incorporation of tag gases within the fuel rods. The reactors include flow paths for directing tag gases released upon failure of a fuel rod to a monitoring and detection system which alerts the plant operator to such failure. Such reactors additionally are designed to prevent the accumulation of gas bubbles which could be swept through the core region. Accordingly, reactor internals are typically configured to vent any gas which enters the reactor system to a cover gas region above the core. The venting system thus permits gases released outside of the core to flow upwardly and eventually mix with any tag and fission product gases released from fuel assemblies within the core.

It is desirable to provide arrangements which allow rapid and accurate weld failure indication. It is particularly desirable to provide such arrangements in nuclear reactors, and to take advantage of existing system designs and configurations.

SUMMARY OF THE INVENTION

This invention provides method and apparatus for detecting cracks or other failures in welds joining plural components, particularly beneficial to remote detection in liquid metal cooled nuclear reactor systems.

In one embodiment a hole or chamber is drilled from a surface of one component, through the weld deposit and into, but not entirely through, the second component. A preselected tag gas is placed within the chamber, and the chamber is sealed at its outer end, such as by a threaded and/or welded plug. Any well-known manner is provided to direct the environment immediately about the welded area, which can be liquid or gaseous, to other well-known apparatus which detects the presence of the tag gas. A trigger gas can also be incorporated with the tag gas to actuate a detection or analyzer system which otherwise is maintained in a non-detecting condition. Detection of the tag gas indicates that a failure has developed which provides a release path between the chamber and the surface of the weld deposit or the joined components.

In an alternate embodiment a plurality of chambers through a given weld area are each provided with different tag gases. Detection of plural tag gases ensures that an indication is not merely spurious, passed as leakage passed the sealing plug, and that a true failure has occurred.

In another embodiment a plurality of chambers are incorporated in a single weld or in different welds, each with a different tag gas. Detection of a given tag gas thus evidences not only the existence of a weld failure, but also the location of the weld or the failed position within a specific weld.

In addition to plural chambers, the volume through which a chamber passes can be varied, extending, for example, over only one weld deposit boundary and terminating within, or at a surface of, the weld deposit. A chamber can also extend from a surface of one of the joined components, through the weld deposit and to the surface of another component, requiring two sealing plugs, among other configurations.

The weld failure detection arrangement is particularly beneficial in the primary structural component welds of a liquid metal cooled nuclear reactor, such as the weld joining the reactor vessel to the core support structures. Leakage from a tag gas filled chamber is readily directed, by the upward flowing coolant and the configurations of the reactor and internals components, to the cover gas at the top of the reactor vessel. The cover gas can be continuously or intermittently monitored, or monitored by a detection system actuated by a trigger gas, for evidence of the tag gas as in proposed systems for monitoring fuel rod failures.

BRIEF DESCRIPTION OF THE DRAWINGS

The advantages, nature and additional features of the invention will be better understood from the following description, taken in connection with the accompanying drawings, in which.

DESCRIPTION OF THE PREFERRED EMBODIMENT

Figure 1:
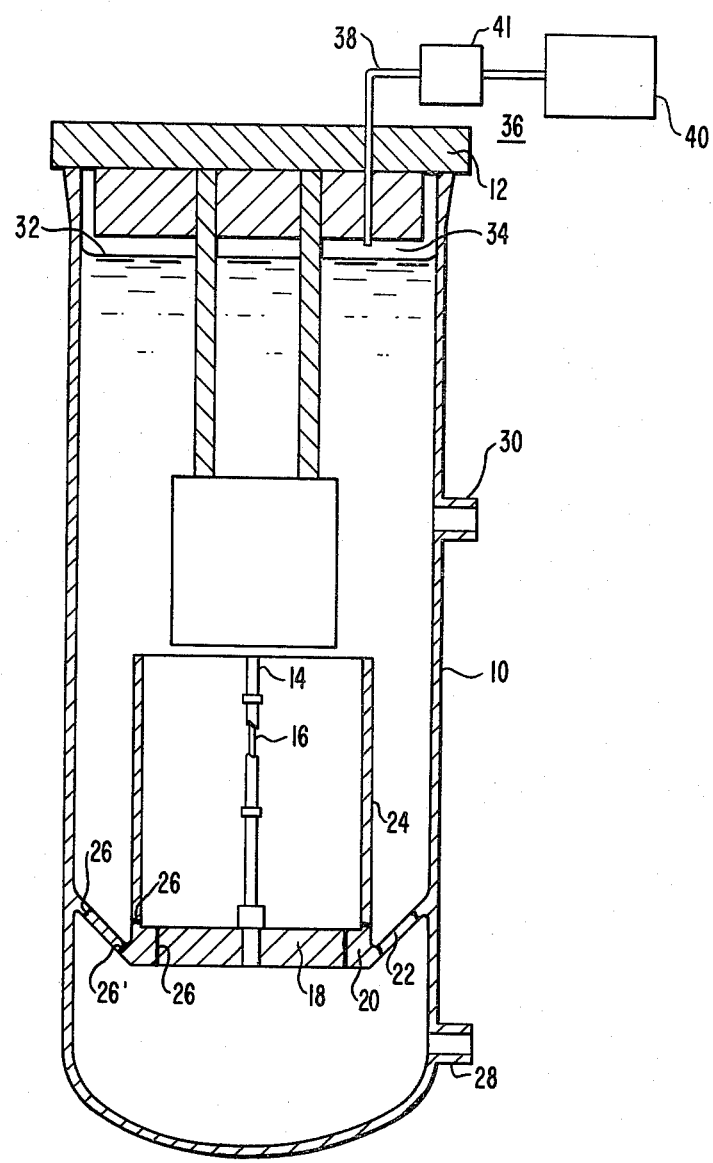
FIG. 1 is a simplified elevational schematic of a nuclear reactor vessel and main internal structures.

Referring now to FIG. 1, there is shown a nuclear reactor vessel 10 including a sealed roof structure 12. Within the vessel 10 is a nuclear core comprised of a plurality of fuel assemblies 14 each having a plurality of sealed fuel rods 16 containing nuclear fuel and a gas plenum. The fuel assemblies 14 are supported upon core support structures including a perforated lower core plate 18 joined to other components such as a transition 20, a cone 22 and a core barrel 24 by welds 26. A liquid coolant, such as sodium, enters the vessel 10 through a plurality of inlet nozzles 28, flows upwardly about the fuel rods 16, absorbing heat energy, and is discharged from the vessel through outlet nozzles 30 to heat exchange apparatus, typically for the ultimate purpose of electric power generation. The coolant then returns to the inlet nozzles 28, completing a circuit through the substantially sealed reactor system.

The level 32 of coolant within the vessel 10 is maintained so as to provide a cover gas space 34 within the reactor vessel. Cover gas samples are continuously or intermittently withdrawn from the gas space 34 by a monitoring system 36 through conduit 38 and directed to an analyzer 40 for determining the gas content. The samples can be returned to the reactor system or further treated.

As well known, the fuel rods 16 can be provided with tag gases, typically non-radioactive isotopes, which, in the event of fuel rod failure, are released into the circulating coolant along with fission product gases and flow upwardly, ultimately entering the cover gas 34. The analyzer 40, upon monitoring of the cover gas, indicates the presence of a tag gas and accordingly a fuel rod failure. The analyzer 40 in presently proposed reactor systems can be activated by a trigger signal from activator 41 which reacts to the presence of a specified level of radioactive fission product gases released with the tag gases upon a fuel rod failure. A typical tag gas system utilizing especially blended krypton and xenon isotopes is discussed in an article entitled "Design and Manufacture of Gas Tags for FFTF Fuel and Control Assemblies", *Nuclear Technology,* Vol. 26, August 1975, incorporated herein by reference.

Figure 2:
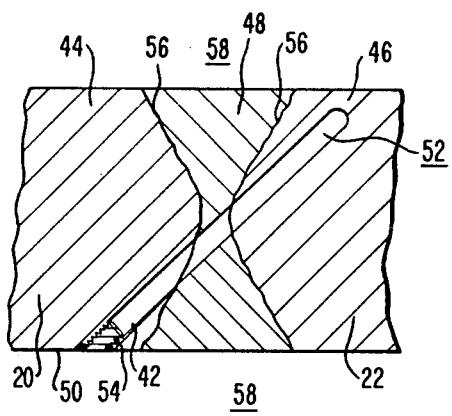
FIG. 2 is an elevation view, in cross section, of a weld deposit, additionally showing system components in accordance with this invention.

In accordance with the invention, the monitoring system 36 can advantageously be utilized to similarly indicate weld failure or crack initiation. FIG. 2 is representative of the welds, for example, the weld 26' between the transition 20 and cone 22. Subsequent to making the weld, a hole or chamber 42 is drilled or otherwise made through selected portions of the component base metal 44, 46 and the weld deposit 48. In the embodiment shown, chamber 42 extends from the surface 50 of the base metal 44, through a portion of the base metal 44, preferably the heat affected zone, through the weld deposit 48, and into the base metal 46. A preselected tag gas 52, different than the fuel rod tag gases, is then injected into the chamber 42 and sealed therein by sealing means such as a plug 54. In order to avoid spurious weld failure indications such as through leakage passed the plug 54, the plug is preferably both threaded into position and additionally welded or otherwise sealed about its periphery. Plural plugs in series can also be utilized for added integrity.

Thus, if a failure in the welded area is initiated, such as a crack or a separation along a fusion line 56 which communicates with the chamber 42 and the outer surface of the welded area, the tag gas 52 is released to the surrounding environment 58. In the nuclear reactor system, the surrounding environment is the reactor coolant through which the gas is directed to the cover gas 34 and the monitoring system 36. While fuel rod failures emit not only the selected tag gas but also radioactive fission product gases which trigger the actuator 41, no similar releases of fission product gases arise from weld failure. Accordingly, a specific trigger gas, such as long-lived radioactive krypton-85 can be incorporated in the tag gas to similarly activate the detection system 36. It will be evident that the trigger gas should be fast-acting in actuation of the detection system, since cover gas cleanup systems would otherwise remove the tag gases prior to their detection.

Figure 3:
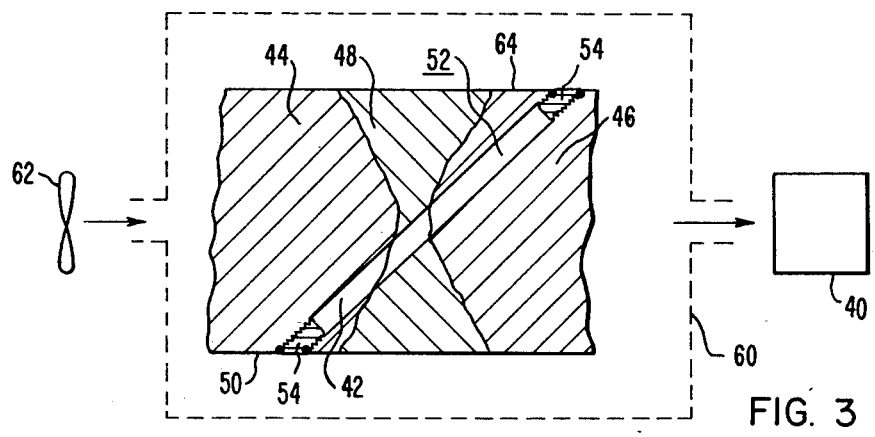
FIG. 3 is another elevation view, in section, of a weld deposit arrangement in accordance with the invention.

The tag gas weld failure detection arrangement can equally be applied to welded structures in other nuclear and also non-nuclear applications, as exemplified in FIG. 3. A weld deposit 48 is disposed between two base metal components 44, 46. A portion of the environment about the welded area, illustrated by the dashed line 60, is directed by drive means such as a pump or fan 62 to an analyzer 40. Tag gas 52 released from the chamber 42 in the event of weld area failure is passed to the analyzer 40 and detected. A trigger gas can also be incorporated with the tag gas to actuate the analyzer 40.

FIG. 3 also shows an alternative chamber 42 configuration, the chamber extending from a surface 50 of the base metal 44, through weld deposit 48 and base metal 46 to a surface 64. Two plugs 54 are accordingly utilized to seal the tag gas 52 within chamber 42. The chamber 42 can be of additional geometric configurations and can extend over additional selected areas.

A plurality of tag gas filled chambers 42 can also be utilized in conjunction with a single weld deposit. For any application, the diameter of a hole of circular cross section or the size of any other configuration can be selected compatible with the size of the weld, the weld stress conditions and material sensitivity to stress concentration. The pressure of the tag gas placed within the chamber can also be selected in conjunction with the chamber volume to provide a sufficient quantity of tag gas for detection. The spacing of plural chambers along a weld should also be based upon the critical crack size for the specific application.

Figure 4:
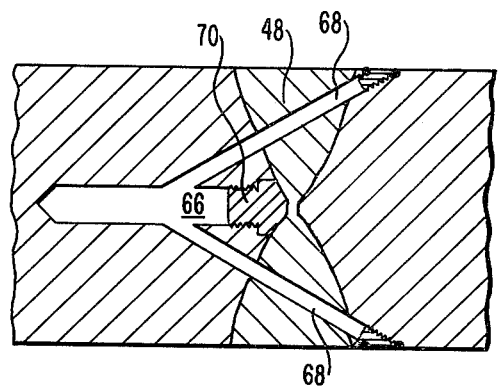
FIGS. 4 and 5 are yet other elevation views in section of weld deposit failure detection arrangements in accordance with the invention.

It will be recognized that the presence of a chamber will necessarily create a stress concentration which can reduce the fatigue life of a welded connection. This affect can be reduced by minimizing the size of a chamber and by adjusting the configuration of the chamber in any number of manners. Where, as is often the case, loading or bending stresses are lower in the central area of welded components and higher at the outer surfaces, a configuration such as shown in FIG. 4 can be utilized, the chamber volume being greater in a central region 66 and smaller at outer extensions 68. The enlarged central region 66 is machined into one or both of the base metal members and sealed by plug 70 prior to final machining of the base metal member preparatory to welding. The plug 70 preferably extends beyond the melting zone of the weld. Subsequent to welding, the smaller diameter extensions 68 are drilled from an outer surface and into the region 66. The tag gas can either be sealed within region 66 prior to making of the extensions 68, or the extensions 68 can be utilized for tag gas charging.

In a system having a plurality of welds, such as with the reactor vessel and internal components, two or more chambers located in close proximity to each other within a given weld, each filled with a different tag gas, can be utilized to enhance reliability of the system. Evidence of only one of these gases would tend to indicate a spurious signal, such as leakage passed a plug, as opposed to actual weld area failure. Simultaneous detection of the tag gases from separate chambers would tend to indicate a true failure. Where different tag gases are utilized within a single weld, detection of a given tag gas further evidences not only the existence of a weld failure, but also the location of the failure within a specific weld. Additionally, plural tag gas filled chambers can be, and in nuclear applications preferably are, positioned through a welded region at intervals such that a crack which eliminates all of the structural capability of the material between the chambers would still be of a size such that the structural integrity of the weld for its intended function will be maintained. This can be compatibly arranged particularly in liquid metal cooled reactors as major components are typically comprised of austenitic stainless steel which has a relatively long critical crack length. The critical crack length is here defined as the length at which the energy liberated as a result of an incremental crack growth is greater than the energy required to cause that incremental growth such that the crack extends in an unstable manner. Thus, an adequate crack detection system for particularly the lengthy welds in a liquid metal cooled reactor, up to several hundred inches, can be obtained using a relatively small number of tag gas chambers in a given weld.

Figure 5:
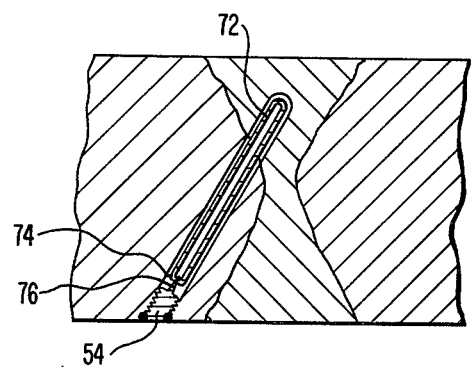

Sealing of the tag gas within the chamber can be accomplished by a number of well known techniques such as sealing of the tag gas while the weld area is disposed in an environment of the desired gas at the desired pressure, or as shown in FIG. 5, by utilization of a container 72, having a rupturable end cap 74 which is pierced by a penetrator 76. Piercing can be accomplished upon insertion of the plug 54 or, for example, by electromagnetically moving the container 72 into contact with the penetrator 76, among other known techniques.

Since numerous changes may be made in the above-described apparatus without departing from the spirit and scope thereof, it is intended that all matter contained in the foregoing description and shown in the accompanying drawings shall be interpreted as illustrative and not in a limiting sense.

We claim:

1. Apparatus for detecting development of a crack in a weld deposit joining a first structure to a second structure, comprising:
    a. means for sealing a preselected tag gas in a selected portion of said weld deposit;
    b. means for detecting said tag gas; and
    c. means for directing a portion of the environment about said weld deposit to said detecting means;
    whereby upon development of a crack in said selected portion of said weld deposit said tag gas is released to said environment and directed from said environment to said detecting means, evidencing said crack.

2. Apparatus of claim 1 wherein said detecting means is actuated by a trigger gas and said trigger gas is sealed through said selected portion along with said tag gas.

3. Apparatus of claim 2 wherein said trigger gas is radioactive.

4. Apparatus of claim 1 wherein said sealing means comprises a chamber passing from a surface of said first structure, through said weld deposit and into said second structure, said chamber being sealed by a plug at its portion near said surface.

5. Apparatus of claim 1 wherein said sealing means comprises a chamber passing from a surface of said first structure and into said weld deposit, said chamber being sealed by a plug at its portion near said surface.

6. Apparatus of claim 1 wherein a second tag gas, different from said preselected tag gas, is separately sealed through another selected portion of said weld deposit.

7. Apparatus of claim 1 comprising a plurality of chambers for respectively sealing a plurality of tag gases within selected portions of said weld deposit.

8. A method for detecting development of a crack in a weld deposit adjacent an environment, comprising:
    a. sealing a preselected tag gas in a selected portion of said weld deposit; and
    b. directing a portion of said environment to apparatus for detecting said tag gas.

9. In a liquid cooled nuclear reactor system having a weld deposit joining two structures disposed within said system and apparatus for directing gases within said system to a detection device, the improvement comprising:
    a preselected tag gas, detectable by said detection device, sealed in a selected portion of said weld deposit,
    whereby upon development of a crack through said selected weld deposit portion said tag gas is directed to, and detected by, said detection device.

10. The reactor system of claim 9 further comprising an actuator cooperating with said detection device and a radioactive trigger gas mixed with said tag gas, said actuator being responsive to said trigger gas to activate said detection device.

11. In a liquid cooled nuclear reactor system having a weld deposit joining two structures disposed within said system and apparatus for directing gases within said system to a detection device, a method for detecting development of a crack in said weld deposit comprising;
    placing a preselected tag gas, detectable by said detection device, in a selected portion of said weld deposit,
    whereby upon development of a crack through said selected weld deposit portion said tag gas is directed to, and detected by, said detection device.

12. The method of claim 11 further comprising placing an actuator in a cooperative orientation with respect to said detection device and mixing a radioactive trigger gas with said tag gas, said actuator being responsive to said trigger gas to actuate said detection device.

* * * * *